United States Patent
Tucker et al.

(10) Patent No.: US 10,719,572 B2
(45) Date of Patent: Jul. 21, 2020

(54) RESOURCE MANAGEMENT FOR OBJECTS WITHIN A WEB APPLICATION

(71) Applicant: ServiceNow, Inc., Santa Clara, CA (US)

(72) Inventors: Christopher Tucker, San Diego, CA (US); Qian Zhang, San Diego, CA (US); Yaron Guez, San Diego, CA (US); Sha He, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/026,694

(22) Filed: Jul. 3, 2018

(65) Prior Publication Data
US 2020/0012743 A1 Jan. 9, 2020

(51) Int. Cl.
*G06F 17/00* (2019.01)
*G06F 16/958* (2019.01)
*G06F 9/50* (2006.01)
*H04L 29/08* (2006.01)

(52) U.S. Cl.
CPC .......... *G06F 16/986* (2019.01); *G06F 9/5011* (2013.01); *H04L 67/02* (2013.01); *H04L 67/32* (2013.01)

(58) Field of Classification Search
CPC .......................... G06F 17/2247; G06F 16/957
See application file for complete search history.

(56) References Cited

U.S. PATENT DOCUMENTS

| | | | |
|---|---|---|---|
| 6,321,229 B1 | 11/2001 | Goldman | |
| 6,816,898 B1 | 11/2004 | Scarpelli | |
| 7,020,706 B2 | 3/2006 | Cates | |
| 7,716,353 B2 | 5/2010 | Golovinsky | |
| 7,769,718 B2 | 8/2010 | Murley | |
| 7,925,981 B2 | 4/2011 | Pourheidari | |
| 8,151,261 B2 | 4/2012 | Sirota | |
| 8,402,127 B2 | 3/2013 | Solin | |
| 8,495,218 B1 | 7/2013 | Shao et al. | |

(Continued)

OTHER PUBLICATIONS

"OneTab extension for Google Chrome and Firefox," printed from the World Wide Web on May 30, 2018.
(Continued)

*Primary Examiner* — Scott T Baderman
*Assistant Examiner* — Barbara M Level
(74) *Attorney, Agent, or Firm* — Fletcher Yoder, P.C.

(57) ABSTRACT

As a web browser application executing on a computing renders a web application that contains a plurality of objects, the web browser application carries out, respectively for each object, a set of resource-consumption actions involving use of resources of the client device. Further, the web browser application dynamically manages operational states of the objects based on a cumulative resource-consumption of the web application, including (i) determining that the cumulative resource-consumption of the web application exceeds a defined limit, and (ii) responsive to the determining, transitioning at least one of the objects from a first operational state to a second operational state, where the object contributes less to the cumulative resource-consumption of the web application in the second operational state than in the first operational state.

18 Claims, 9 Drawing Sheets

(56) References Cited

U.S. PATENT DOCUMENTS

| | | |
|---|---|---|
| 8,612,408 B2 | 12/2013 | Trinon |
| 8,646,093 B2 | 2/2014 | Myers |
| 8,832,652 B2 | 9/2014 | Mueller |
| 9,098,322 B2 | 8/2015 | Apte |
| 9,158,845 B1 | 10/2015 | Reddy et al. |
| 9,182,951 B1 | 11/2015 | Ormerod et al. |
| 9,317,327 B2 | 4/2016 | Apte |
| 9,363,252 B2 | 6/2016 | Mueller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 9,819,729 B2 | 11/2017 | Moon |
| 2011/0088039 A1* | 4/2011 | Tabone ............... G06F 21/6218 718/104 |
| 2012/0060083 A1* | 3/2012 | Yuan ..................... G06F 16/957 715/234 |
| 2012/0317363 A1* | 12/2012 | Uola ................... G06F 12/0806 711/130 |
| 2014/0365794 A1* | 12/2014 | Decker ................. G06F 1/3246 713/320 |
| 2015/0007108 A1* | 1/2015 | Ozcelik ................ G06F 3/0482 715/810 |
| 2015/0095838 A1* | 4/2015 | Rossi .................... G06F 3/0483 715/777 |
| 2017/0177898 A1 | 6/2017 | Dillenberger et al. |

OTHER PUBLICATIONS

"CPU cache—Wikipedia," printed from the World Wide Web on May 30, 2018.

Timo Aho et al.; "Designing IDE as a Service", Jan. 1, 2013, XP055626490; retrieved from http://www.cs.tut.fi/ohj/amda/papers/arvue2012_submitted.pdf.

Extended European Search Report for European Patent Application No. 19183944.8 dated Oct. 4, 2019, 11 pgs.

Examination Report for Australian Patent Application No. 2019204764 dated Mar. 16, 2020; 3 pgs.

* cited by examiner

RESOURCE MANAGEMENT FOR OBJECTS WITHIN A WEB APPLICATION

BACKGROUND

A typical web application consists of a number of elements arranged hierarchically or in another manner to facilitate rendering by a web browser application running on a client device. The web application can be written in hypertext markup language (HTML) or another suitable markup language that the browser is configured to render, including tags and other content defining or corresponding with elements of the web application. Further or alternatively, aspects of the web application can be defined dynamically using JavaScript or other scripting languages. For instance, a set of JavaScript code could be written to dynamically define the general structure or shell of a web application and to then use context (such as stored user information or user input) to obtain or build other elements of the web application. A web browser could obtain the JavaScript code from local storage or by request from a server (e.g., by an application programming interface (API) call) and, in accordance with the code, could render the web application.

In addition, the JavaScript code or other logic underlying a web application could define various subscriptions or other mechanisms to facilitate dynamic updating of web application content such as particular elements or groups of elements. These subscriptions could implement a subscribe-publish protocol and a persistent connection (e.g., open web socket) between the web browser and a server, with browser sending a subscription query to the server and the server establishing a mapping of the subscription to particular channels, data records, or other content and being configured to push updates to the browser. When the server detects content updates (e.g., when a data record is changed), the server could thus transmit the updated content to the web browser. And when the browser receives the updated content, the browser could accordingly re-render or otherwise update the web application.

SUMMARY

When a web browser renders a web application, the browser maintains in memory a Document Object Model (DOM) that defines the hierarchical structure of the web application and its elements, represented as objects, and may define behavior and attributes of those objects. The stored DOM of the web application may represent these objects with a DOM tree structure and may define a programming API interface that allows the browser to interface with and manipulate the objects. To render the web application, the browser could then translate the DOM into an element tree and then lay out and paint or otherwise present the element tree.

In addition, the browser may maintain in memory a data model of the web application including data associated with the underlying objects of the web application, such as web-application-generated data, user-entered data, and/or subscription-updated data. The browser may construct the data model as a hierarchy of JavaScript objects, each having attributes or properties, such as type, title, ID, value, status, content, and the like. Further, the browser may store in the data model and in a subscription registry various indicia of active subscriptions for the web application. For instance, the browser may store and register subscriptions on a per object basis, so that when the browser receives subscription updates, the browser can update the appropriate portions of the data model (e.g., by changing values, status, etc.)

In some implementations, the browser could build the data model for a web application in accordance JavaScript code underlying the web application and/or based on data that the browser receives from a web server. For instance, in accordance with JavaScript code, the browser could make one or more API calls to retrieve a set of raw data records from a server and could build the data model based on that raw data, generating JavaScript objects corresponding with associated objects of the web application, and populating those JavaScript objects with associated data. And in accordance with the JavaScript code, the browser could establish subscriptions for the web application and could record indicia of those subscriptions in the established data model. Further, as content of the web application changes through user interaction or subscription updates, for instance, the browser could accordingly update the data model.

Further in accordance with the JavaScript code or other logic, the browser could generate the DOM of the web application based on the data model of the web application. For instance, using a model-view-controller (MVC) architecture, the browser could translate content of the data model into DOM objects (e.g., translating text from the data model into a label object) and/or could automatically generate particular DOM objects having attributes and properties in line with content of the data model. When changes occur in the data model, the browser could then responsively make associated changes to the DOM, to facilitate changes in the rendered web application.

Alternatively, the browser may generate the DOM based on an HTML document representing the web application and may generate the data model in parallel based on the HTML document and/or the DOM, possibly in accordance with associated scripting. Other procedures are possible as well.

In some cases, rendering a web application like this may strain limited resources of the client device, such as limited memory or processing power. This can be the case especially for a web application that is composed of a great many objects that hierarchically encompass other objects, particularly objects that have associated subscriptions.

Without limitation, an example of such a web application is one that includes many content containers, particularly where each content container encompasses other objects and has one or more associated subscriptions to receive updates from a server or other data source. For each such content container, the browser may maintain an associated data model as part of the web application data model, an associated DOM as part of the web application DOM, and associated subscription data (possibly as part of the container's data model). Yet the web application may be configured such that, for a group of these content containers, only one is shown in the foreground at any given a time.

For instance, a web application could include many content containers that each have a respective pane encompassing a portion of the web application content and that each have a respective header labeled with a title of the container. These containers could be defined in sequence or hierarchically (e.g., with levels of containers within other containers). Further, the pane of each such container could have a visibility property that can be toggled to indicate whether the pane is hidden or showing at any given time. Through associated JavaScript code or other logic (e.g., application data logic), the web application could be then configured to show only one container's pane at a time, based on user selection or other criteria.

With this arrangement, the rendered web application may show all of the containers' headers (e.g., as a scrollable list or sequence of headers) but may show just a single container's pane at any given time. And when a user clicks on the header of a different container, the browser may simply change style properties to hide the currently visible pane and to instead show the pane of the user-selected container.

To facilitate this, the browser may maintain the data model, DOM, and subscription(s) for each of the containers—including all of the containers whose panes are not currently shown. That way, the browser can still receive any subscription updates for containers that are not shown, and the browser can accordingly update those containers in the background. And conveniently, when a user selects a new container to bring to the foreground, the browser can quickly show that container's pane by simply toggling the pane's visibility property. Further, the browser may present an indicator (e.g., a symbol or stylized font) in the container's header, to alert a user that the container has been updated in the background.

Maintaining the data model, DOM, and subscriptions for so many containers, however, could strain resources of the client device. For example, storing of all of this data could consume significant memory (e.g., cache memory) resources. And as another example, maintaining subscriptions for so many containers could require many open web sockets or the like and could consume significant processing resources to monitor for and process subscription updates.

Further, as a browser renders such a web application, the quantity of containers in the web application may grow over time. For instance, when the browser initially renders the web application for a user, the web application may include a small number of such containers. But over time, the browser may add more containers to the web application. For example, in response to user input or other criteria, the browser may make API calls to retrieve data associated with new containers, the browser may supplement the web application data model and DOM with data models and DOMs of each new container, and the browser may establish one or more subscriptions for each new container. As the number of containers in the web application grows, the browser may consume more and more resources of the client device.

Ultimately, this extensive use of client resources could impact device performance, especially in resource-limited or performance-limited devices such as mobile devices or the like, giving rise to possible user experience issues and other problems.

Disclosed herein is a method and system to help effectively manage resource consumption associated with objects within a web application, such as containers within the web application. In accordance with the disclosure, the browser will dynamically transition objects between various operational states, in an effort to limit the overall extent of resources consumed by the web application.

On a per object basis, these states may differ from each other based on resource-consumption actions that the browser carries out for the object, such as whether the browser maintains a DOM for the object, whether the browser maintains one or more subscriptions for the object, and whether the browser maintains a data model for the object. For instance, (1) a first state could be where the browser maintains for the object a DOM, one or more subscriptions, and a data model, (2) a second state could be where the browser maintains for the object one or more subscriptions and a data model, but not a DOM, (3) a third state could be where the browser maintains for the object no data model, subscriptions, or DOM (except perhaps a pointer).

Per the JavaScript code or other logic, the browser could then dynamically transition objects between these states based on various criteria. By way of example, the browser could impose progressive limits on how many objects of the web application are allowed at any given time in each state and could transition objects between state when these limits would be exceeded.

For instance, the browser could impose a limit of five objects in the first state, and when a sixth object is put in the first state the browser could transition one of the other objects (e.g., the oldest or most resource intensive) from the first state to the second state in order to keep the quantity of objects in the first state at no more than five. And the browser could impose a limit of twenty objects in the second state, and when a twenty-first object is put in the second state, the browser could transition one of the other objects (e.g., the oldest or most resource intensive) from the second state to the third state.

As another example, the browser could impose limits on the extent of resources consumed by the web application as a whole, such as the total size of the web application's DOM, the total size of the web application's data model, and/or the total number of subscriptions or quantity of subscription resources (e.g., web sockets) used for the web application, and could transition objects between states when these limits would be exceeded.

For instance, the browser could monitor the size (e.g., memory consumption) of the web application's DOM, and when the DOM exceeds a maximum limit set per this process, the browser could transition one or more of the web application's objects (e.g., the oldest or most resource intensive) from the first state to the second state to help keep the web application's DOM within the size limit. Similarly, the browser could monitor the size (e.g., memory consumption) of the web application's data model, and when the data model exceeds a maximum limit, the browser could transition one or more of the web application's objects (e.g., the oldest or most resource intensive) from the second state to the third state to help keep the web application's data model within the size limit. And likewise, the browser could monitor the quantity of subscription resources used for the web application, and when the quantity exceeds a maximum limit, the browser could likewise transition one or more of the web application's objects (e.g., the oldest or most resource intensive) from the second state to the third state to help keep the web application's quantity of subscription resources within the limit.

In practice, the browser could be configured to carry out these operations generally for any given web application that the browser renders. Alternatively, the operations could be dictated by JavaScript code or other logic that a server provides to the browser to facilitate rendering of the web application. For instance, JavaScript code underlying the web application could be configured to instruct or otherwise cause the browser to apply object-limits or resource-limits like those discussed above and to dynamically transition objects of the web application between operational states as discussed above.

Accordingly, in a first example embodiment, disclosed is a computing device comprising a processing unit, data storage, and a web browser application stored in the data storage and executable by the processing unit to carry out various operations. The operations include rendering a web application, where the web application contains a plurality of objects, and where rendering the web application includes carrying out, respectively for each object of the plurality of objects, a set of resource-consumption actions involving use of resources of the computing device. Further, the operations include dynamically managing operational states of the objects based on a cumulative resource-consumption of the web application, including (i) determining that the cumulative resource-consumption of the web application exceeds a defined limit, and (ii) responsive to the determining, transitioning at least one of the objects from a first operational state to a second operational state, where the object contributes less to the cumulative resource-consumption of the web application in the second operational state than in the first operational state.

In a second example embodiment, a method may include a web browser application executing on a computing device carrying out operations in accordance with the first example embodiment.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a web server application executing on a computing device may receive an API call from a client device requesting JavaScript code and may respond by transmitting to the client the JavaScript code, where the JavaScript code is interpretable by the client device to carry out the dynamic management of operational states of web application objects in accordance with the first example embodiment.

In a fifth example embodiment, a system may include various means for carrying out each of the operations of the other example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

DETAILED DESCRIPTION

Figure 1:
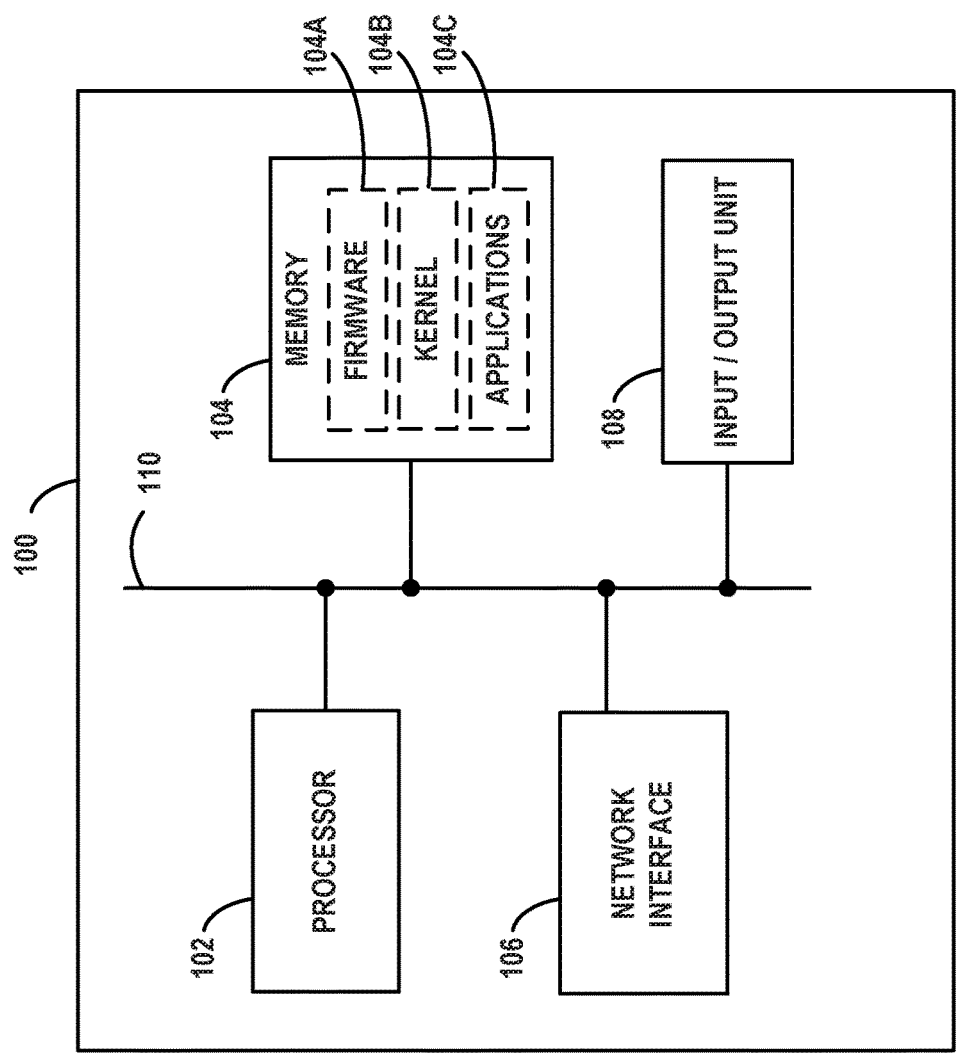
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of MVC applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
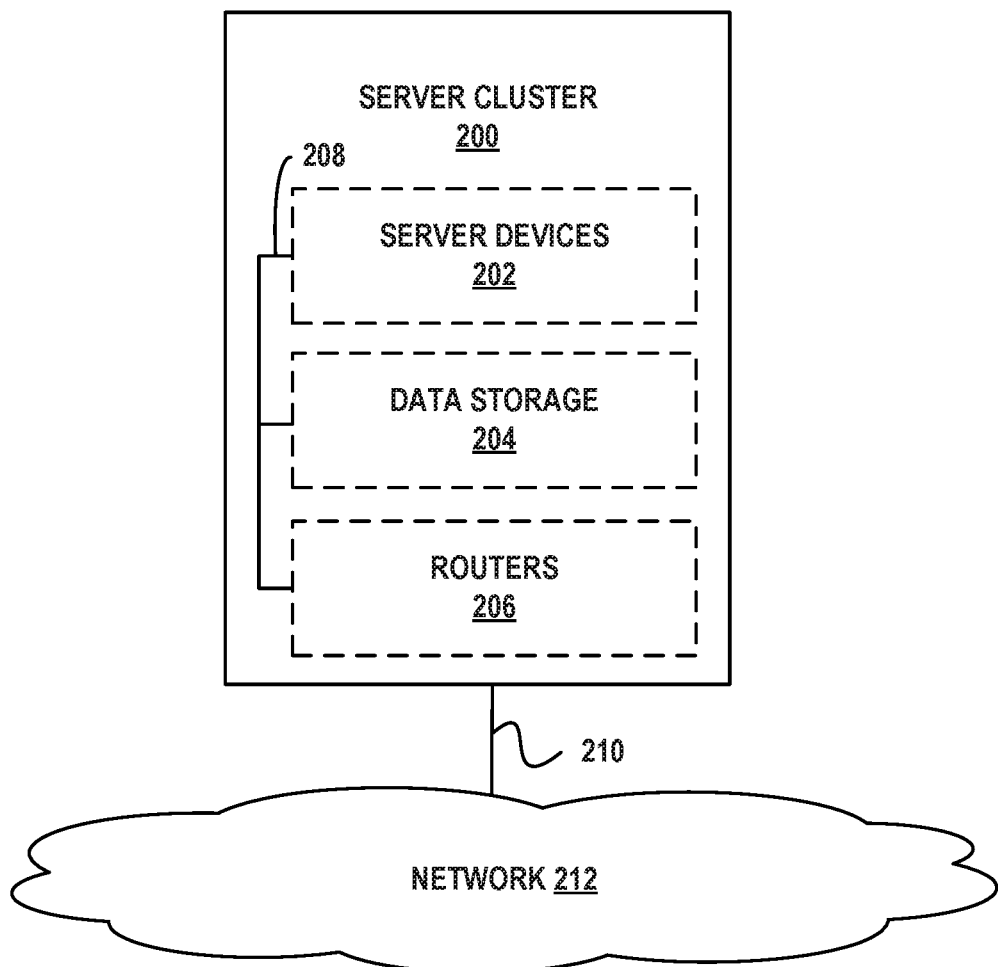
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the HTML, the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
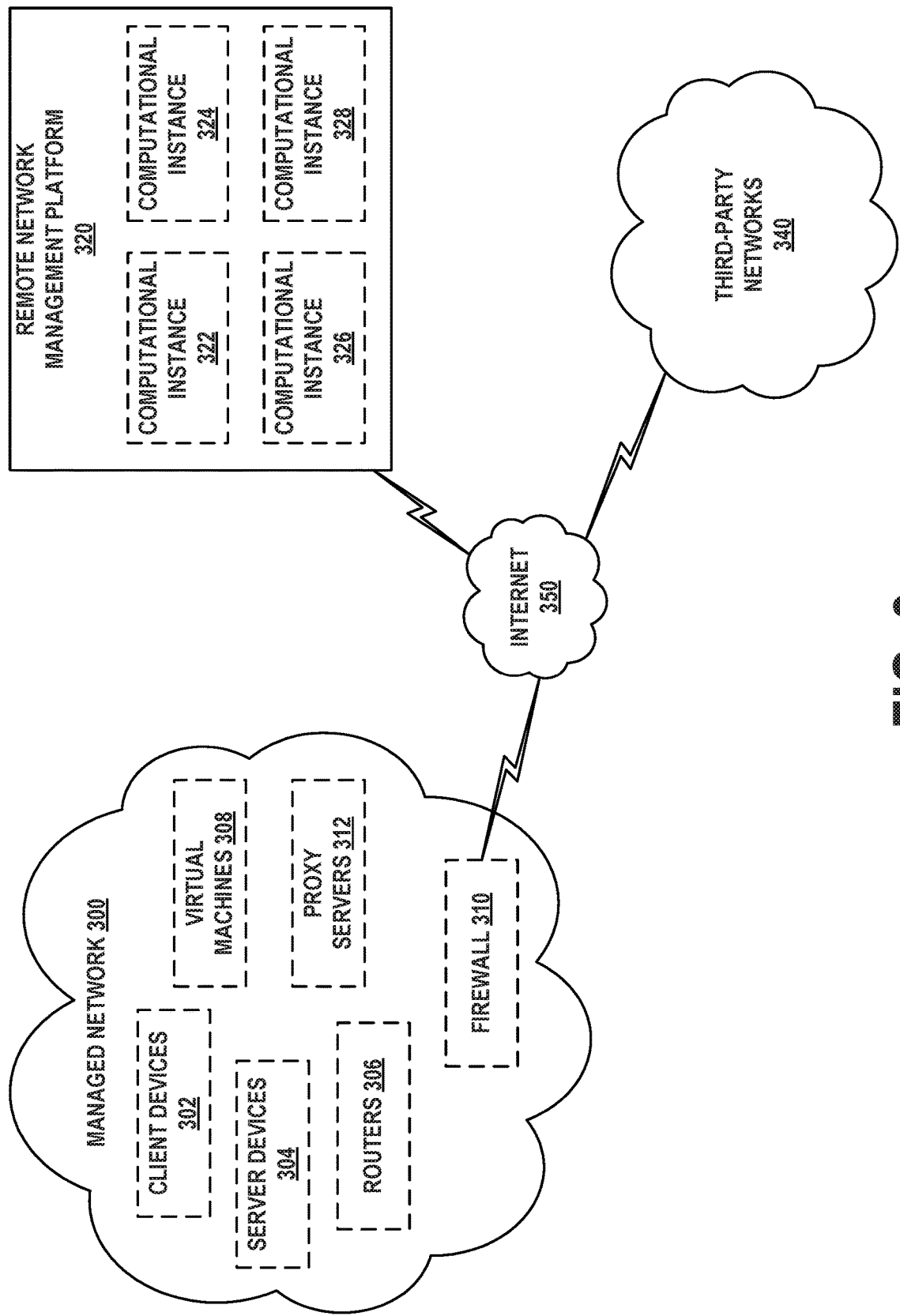
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
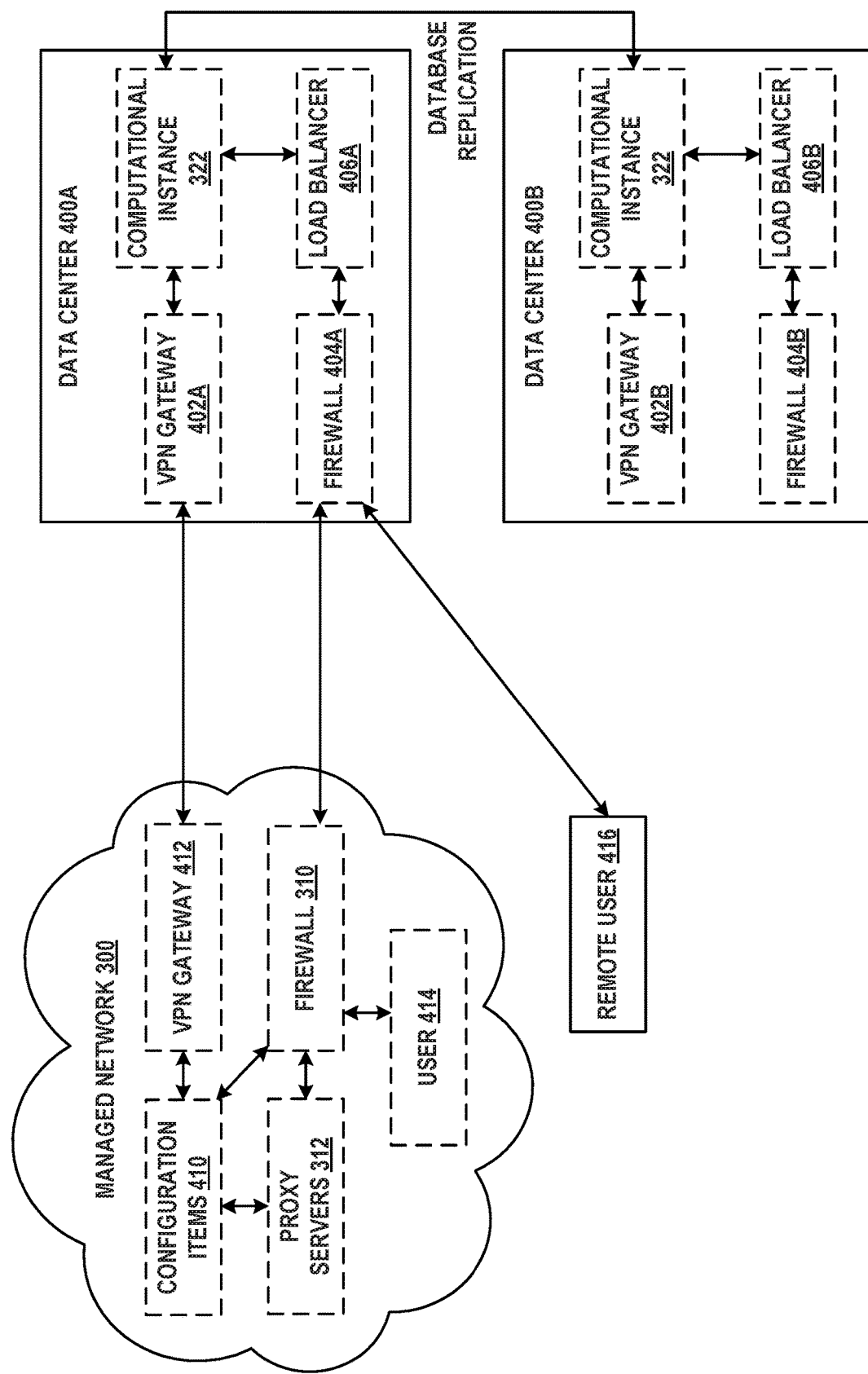
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B.

After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
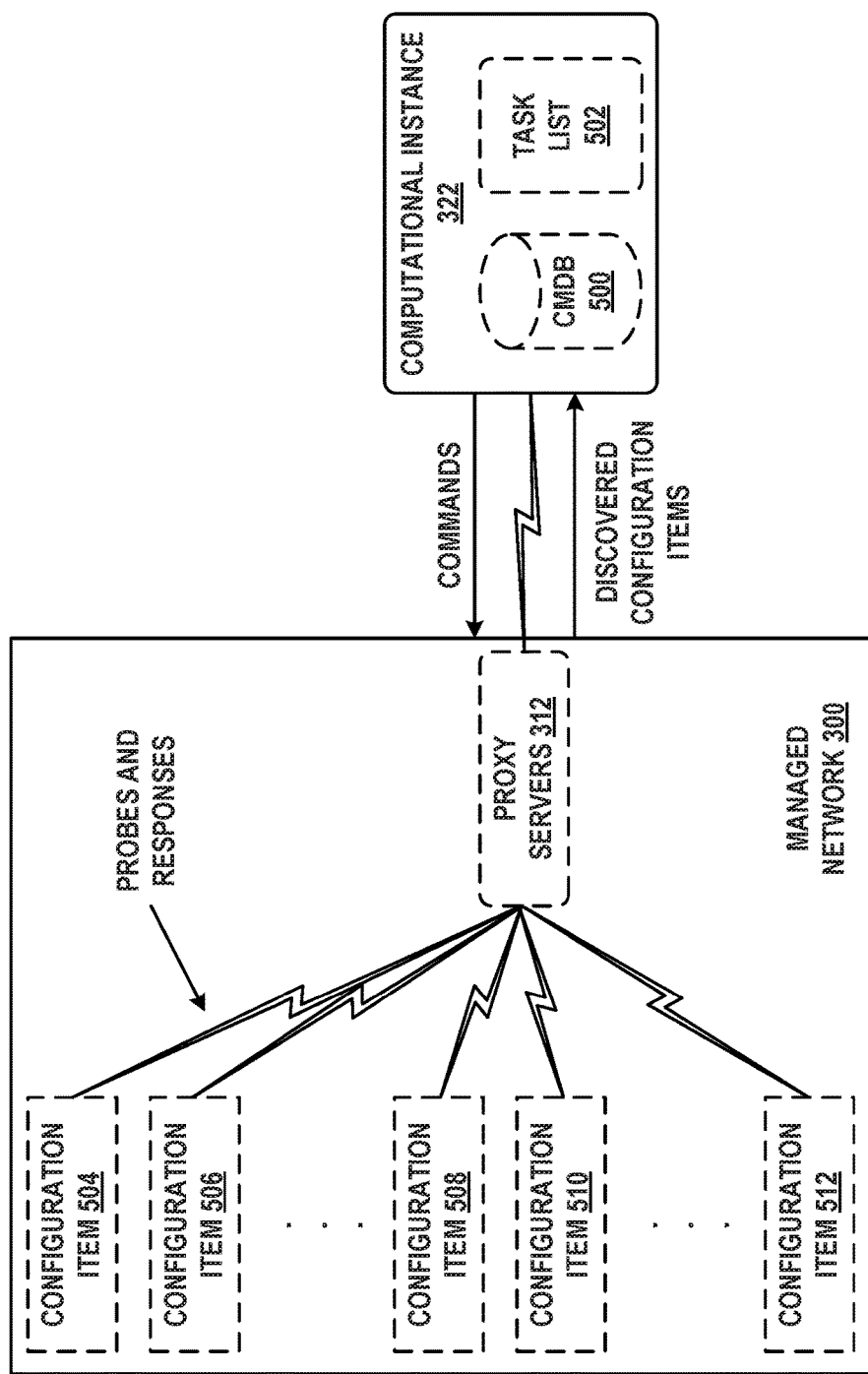
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
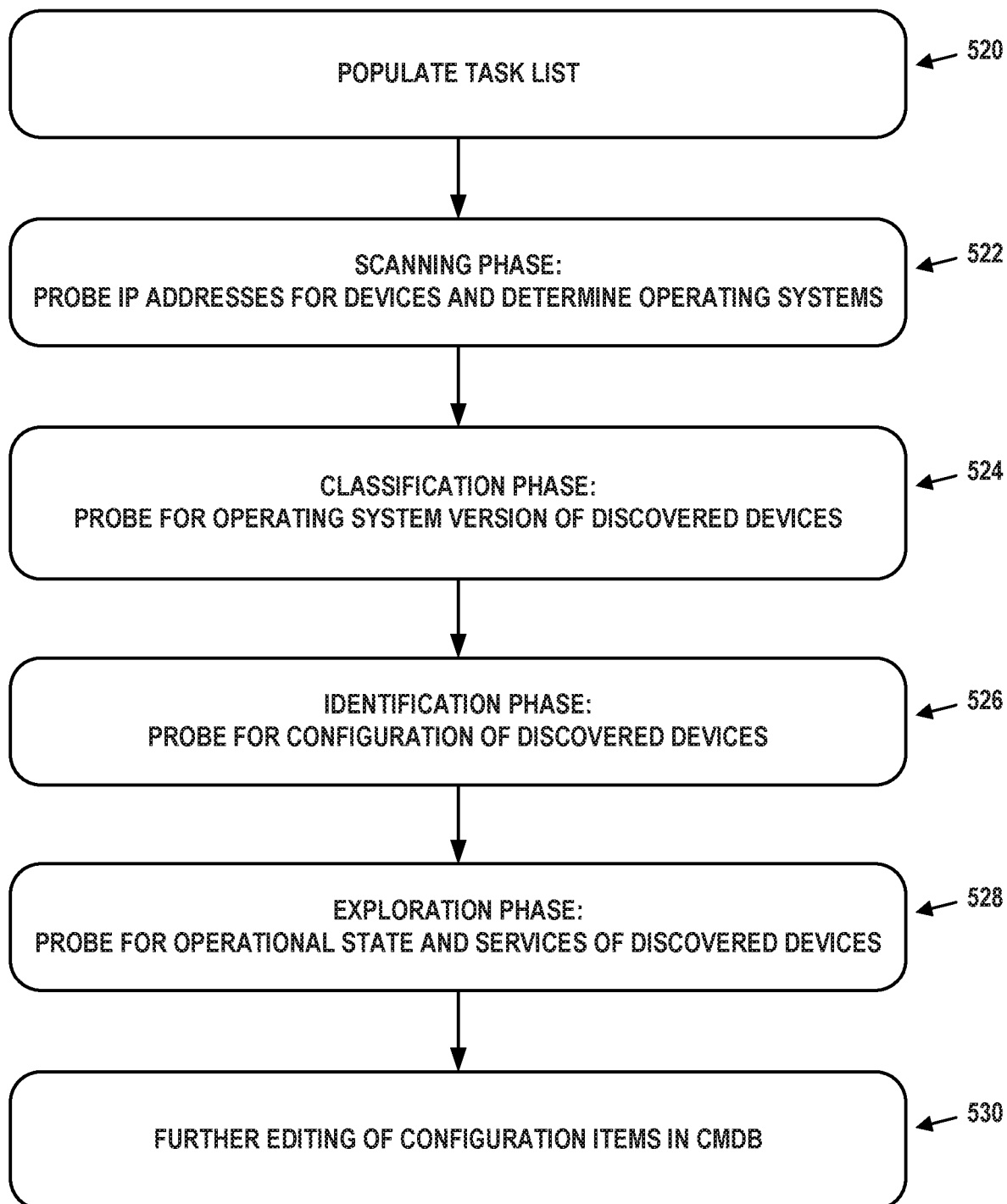
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE RESOURCE MANAGEMENT FOR OBJECTS WITHIN A WEB APPLICATION

As noted above, software applications may be developed by individual departments within an enterprise. Such applications could include or take the form of web applications, including one or more web applications configured to be rendered by web browsers executing on client devices to facilitate dynamic interaction with end users. For instance, an aPaaS system hosted remotely from the enterprise could serve web applications to client browsers.

As further discussed above, a representative web application may include many objects, and the process of the web browser rendering the web application may include the web browser making use of client device resources to facilitate rendering the various objects.

For purposes of illustration, and without limitation, the remainder of this description will focus on an implementation in which the objects at issue in the web application are a particular type, namely, container objects (such as tabs, frames, tables, or the like) that encompass other objects of the web application (such as forms, lists, other nesting containers, or the like). As noted above, each such container may include a pane defining the body of the container that includes one or more encompassed objects, and a header portion that may present a title or subject matter of the container regardless of whether the pane of the container is currently shown or hidden. Further, also for purposes of illustration and without limitation, the description will focus on an implementation where the client-device resources that are at issue include resources such as memory, web sockets, and processing power. It should be understood that numerous alternatives are possible as well.

In an example implementation, a user operating a client computing device may initiate a web-based application such as a remotely-hosted application as discussed above. For instance, the user may enter into a web browser a uniform resource locator URL associated with the web-based application, causing the browser to send to a web server a request for the application. And the web server may responsively transmit to the browser an initial web application defining at least a general shell of the application. More particularly, as noted above, the server may transmit to the browser a set of JavaScript code that is written and interpretable by the web browser to define the general structure or shell of the web application. Further, the server may transmit to the browser associated HTML or other markup defining aspects of the web application. The browser may thus receive this JavaScript code, and perhaps associated HTML, and may render the web application.

This JavaScript code received by the browser may define the shell of the web application by defining where the browser should render particular core web application features, such as a web application header, a web application side bar, and a web application center (or main) portion (e.g., frame) where additional content can be rendered, among other possibilities. Thus, the browser may interpret JavaScript code and thereby render a core user interface of the web application.

As noted above, to render the web application in an example implementation, perhaps in accordance with the JavaScript code, associated HTML, and/or core browser logic, the browser may build a data model for the web application. In particular, the browser may construct the data model as a hierarchy of JavaScript objects corresponding with various objects of the web application and may store or otherwise indicate data associated with each such web application object. For instance, as noted above, the JavaScript objects of the data model may indicate, for each object of the web application, data such as object type, title, ID, value, status, content, and the like. Further, the JavaScript code, HTML, and/or other logic may indicate correspondence between these JavaScript objects of the data model and various objects of the web application.

In the example implementation, the data model of the core web application may thus include data associated with the web application object itself, as well as data associated with objects within the web application, such as a web application header, a web application side bar, and web application center portion. Further, for each such object of the web application that hierarchically encompasses other objects, the data model may include data associated with each encompassed object. Ultimately, the data model may thus define a hierarchical data model tree representing data associated with various objects of the web application.

The JavaScript code that the browser receives initially may itself indicate some or all of the data for the browser to store in the data model for the web application. Alternatively or additionally, the JavaScript code may cause the browser to make one or more API calls (e.g., Asynchronous JavaScript and XML (AJAX) calls) to retrieve data records that the browser may then translate into data model records for the web application. In particular, as noted above, the browser may receive raw data records from a server, and the browser may build some or all portions of the data model based on that raw data, generating JavaScript objects corresponding with associated objects of the web application, and populating those JavaScript objects with associated data.

The browser may build the data model of the web application within cache memory or other memory or data storage of the client device, so that the browser can have ready access to the data model in order to determine data that is or should be associated with particular objects within the web application.

As further noted above, to render the web application in the example implementation, also perhaps in accordance with the JavaScript code, associated HTML, and/or core browser logic, the browser may build a DOM of the web application. For instance, as noted, the browser may use an MVC architecture to translate content of the data model into DOM objects and/or could automatically generate particular DOM objects having attributes and properties in line with content of the data model. Alternatively or additionally, the browser may generate some or all of the DOM based on associated HTML. In any event, the DOM of the web application may define a DOM tree, hierarchically representing objects of the web application As noted, the DOM of the web application defines the hierarchical structure of the web application and its elements, represented as objects, and may define behavior and attributes of those objects. For instance, the DOM may represent these objects with a DOM tree structure, where the nodes of the DOM tree represent the various objects of the web application and the hierarchical arrangement of the nodes represents the structure of the web application. To complete rendering of the web application, the browser may then construct a render tree based on the web application DOM, where the render tree comprises a hierarchy of typically rectangular portions of the web application with dimensions suitable for layout on a display, and the browser may then lay out and paint the render tree as a user interface on the display.

The browser may build the DOM of the web application within cache memory or other memory or data storage of the client device as well, so that the browser can have ready access to the DOM in order to determine the structure of the web application, such as the visual interrelationship between objects of the web application.

In the example implementation, the JavaScript code may also cause the browser to process user login. For instance, the browser may present a login dialog to receive user credentials and/or the browser may have cached user credentials. Per the JavaScript code, the browser may make one or more API calls to a server to log in the user, so as to facilitate tailoring the web application to the user's circumstances, such as presentation of containers and other objects related to the user's job, account, or the like.

Through this login process or in another manner, the browser may receive from the server one or more sets of data that correspond with one or more container objects (containers) to be included within the web application. For instance, the browser may receive from the server an identifier respectively or each of one or more sets of data corresponding with one or more such containers, and the browser may then make API calls requesting each such data record. Alternatively, the server may more directly return the applicable data sets to the browser in response to successful user login or in other circumstances.

In the example implementation, the data that the browser obtains for a given container through this process may include (i) data indicating that the object at issue is a container, such as particular type of container, (ii) data identifying the container, such as a container name and/or identification code, and (iii) data associated with one or more objects encompassed by or otherwise contained in the container, among other items.

The data indicating that the object is a container may enable the browser to render the object as a container within the web application. The data identifying the container may enable the browser to render a header portion, such as a top tab or handle of the container that may present an identification of the container such as the container name. And the data associated with the one or more objects contained in the container may then similarly include, for each contained object, data indicating a type the object, data identifying the object, and possibly data identifying and providing data for one or more further hierarchically-encompassed objects.

By way of example, a container object may be a tab or other container that contains a form related to certain remotely-managed data, and the form may comprise multiple labels, text-entry fields, buttons, and/or other objects. The data that the browser receives from the server for such a container may include data identifying the subject matter of the form, enabling the browser to indicate that subject matter in the header of the container. Further, the data may include data underlying the form, such as data underlying various objects of the form.

In accordance with the JavaScript code or other logic, the browser may then use the data received for each such container to build a data model for the container, as part of the data model for the web application as a whole. For instance, the browser may generate a hierarchy of JavaScript objects corresponding with objects of the container and may populate the JavaScript objects with the associated data. Thus, for each such container, the browser may supplement the stored web application data model with the container data model.

In addition, for each of a plurality of representative containers included in the web application initially or through this process, the browser may also establish and maintain one or more subscriptions to receive updates when data underlying the container. As noted above, these subscriptions could implement a subscribe-publish protocol and a persistent connection, such as an open web socket between the web browser and a server. Alternatively, some subscriptions could be to receive local updates, such as updates from other web applications running on the client device, other containers within the web application, or other data sources.

In the example implementation, for instance, pursuant to the JavaScript code, the browser may automatically subscribe to receive updates of the data set underlying each of multiple containers included in the web application. For example, for each such container, the browser may engage in signaling with a server to establish a web socket, through which the browser may send to the server a subscription query keyed to the data set that the browser received for the container. When a change occurs to that data, the server may then transmit through the web socket to the browser an updated or incrementally changed set of data underlying the container, and the browser may accordingly update the stored container data model and in turn update the associated DOM and rendered container.

For each such subscription established by the browser, there may be an associated open web socket with the server. Alternatively or additionally, for each subscription, the browser may store in the container data model and perhaps in a separate subscription registry an indication of the subscription. Further, the browser may associate each such web socket and/or subscription record with the data set, such as a data set identifier. That way, when the browser receives an update, the browser can responsively update the appropriate data model, DOM, and rendered container.

As a user interacts with the web application, and/or initially or in other circumstances or for other reasons, the web application may grow to include many such containers. For example, through interaction with the web application, a user may click on links that cause the browser to obtain and render additional containers. The browser may render such containers sequentially on the web application, such as horizontally and/or vertically one after the next with partial overlap or the like. Alternatively or additionally, some of the containers could be sub-containers of other containers, thus possibly defining levels of containers. Further, the browser could permit scrolling if all of the containers do not fit in the display window at once.

Figure 6:
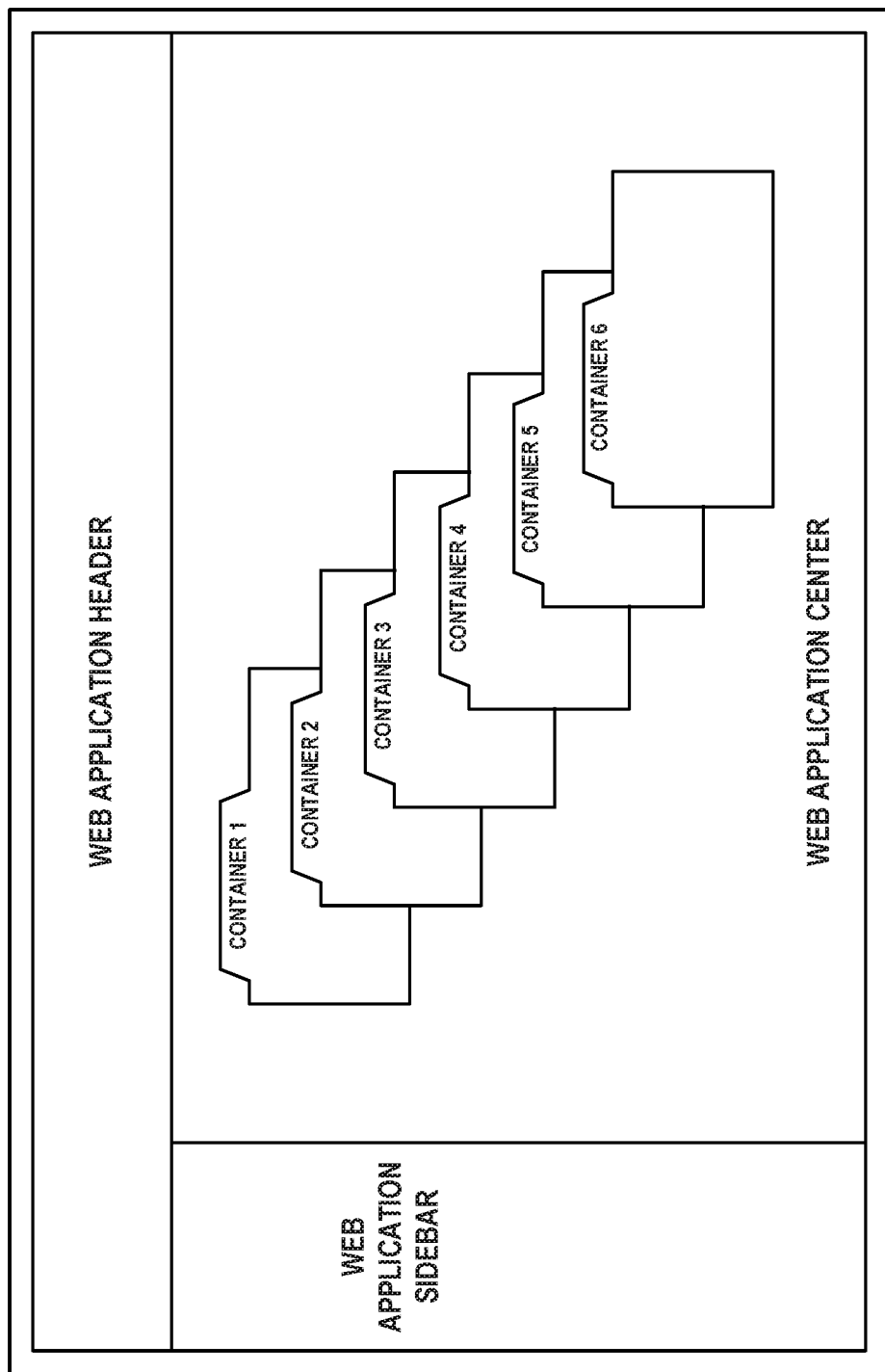
FIG. 6 is an illustration of an example web application including multiple containers, in accordance with example embodiments.

FIG. 6 illustrates an example of a web application including the shell elements noted above, including a web application header, side bar, and center portion, and further including many representative containers. The containers in this example partially overlap with each other. A header portion of each container is shown, to enable a user to see at a glance the subject matter of the container. Further, each container includes a pane that encompasses its contents, such as a form as noted above, but the pane of only one container is shown (i.e., in focus or in the foreground) at a time, with the pane of each other container being hidden (i.e., out of focus, or in the background). In the example implementation, the header of each container whose pane is hidden is clickable by a user to toggle showing of the container and hiding of the currently shown container.

In line with the discussion above, as the browser adds new containers to the web application, the browser may thus add to the web application's data model, DOM, and subscriptions. In particular, for each newly added container, the browser may add to the web application's data model a respective container data model, the browser may add to the web application's DOM a respective container DOM, and the browser may add one or more subscriptions to receive updates when data underlying the container changes.

As a result, the web application may grow to consume more and more resources of the client device. For instance, as the browser adds container data models, the total size (e.g., in bytes) of the web application data model would grow, and the web application data model would therefore consume more and more memory (e.g., cache memory) of the client device. Likewise, as the browser adds container DOMs, the total size of the web application DOM would grow, and the web application DOM would thus consume more and more memory of the client device. And the browser adds container subscriptions, additional memory would be used for recording the subscriptions, and additional web sockets and processing power may be needed to support the subscriptions.

As noted above, features of the present disclosure may help to manage resources of the client device in this situation. In particular, according to the disclosure, the browser may dynamically transition operational states of the containers within the web application, with the operational-state transitions helping to control the web application's overall consumption of client device resources. For instance, the disclosed features could help to save memory, processing power, and/or network resources within the client device.

In the example implementation, for each of at least a plurality of containers in the web application, the browser will carry out a set of resource-consumption actions that involve use of resources of the client device. In line with the discussion above, these resource-consumption actions could include (i) maintaining a DOM for the container, which may use cache memory resources of the client device, (ii) maintaining one or more subscriptions for the container, which may use cache memory, web socket, and processing resources of the client device, and (iii) maintaining a data model for the container, which may use cache memory resources of the client device. Alternatively or additionally, other resource-consumption actions and/or resources could be involved.

Further, the JavaScript code could be configured to define container operational states including an "active" state, an "inactive but subscribed" state, an "inactive and not subscribed" state, and an "inactive and destroyed" state, among other possibilities. And the JavaScript code could cause the browser to dynamically transition containers between these operational states based on an evaluation of the web application's cumulative resource consumption.

In an example implementation, the "active" state of a container could be where the browser maintains for the container a DOM, one or more subscriptions, and a data model, as discussed above. Whereas, the "inactive but subscribed" state of a container could be where the browser does not maintain for the container a DOM but the browser still maintains for the container one or more subscriptions and a data model. Thus, for a container in the "inactive but subscribed" state, the browser could still receive and process updates of the container's data model, and when appropriate the browser could re-create the container's DOM and re-render the container or its contents.

Optimally, a container that is in focus (i.e., the container whose pane is currently shown) will be in the "active" state. And for a container that is not in focus but that is in the "inactive but subscribed" state, if/when the browser receives and processes an update of the container's data model, the browser may present an indication (such as a dot or other symbol and/or a stylized font) in the container's header to alert a user that the container's contents have been updated. If/when the user then clicks on the header of the updated container to bring the container's pane into view, the browser could then re-render the container with its updated contents.

To transition a container from the "active" state to the "inactive but subscribed" state, the browser could delete from the DOM of the web application a DOM of the container, possibly leaving in the web application DOM a container root node as a pointer indicating where the container's DOM was within the web application DOM. But the browser could still maintain the container's one or more subscriptions and the container's data model, so that the browser can keep the container's data model up to date even though the browser does not maintain a DOM for the container. And to transition a container from the "inactive but subscribed" state to the "active" state, such as when a user clicks the header of the container to bring it into focus, the browser could recreate the container's DOM, based on the container's data model, and the browser could attach the recreated container DOM to its proper place in the web application DOM and render the container accordingly.

The "inactive and not subscribed" state could then be where the browser does not maintain for the container a DOM or any subscriptions but where the browser still maintains for the container a data model. Thus, to transition a container from the "inactive but subscribed" state to the "inactive and not subscribed" state, the browser could release any subscriptions that the browser was maintaining for the container, perhaps signaling to one or more servers to terminate each such subscription and deleting the associated subscription data from the container's data model. In this state, the browser may still store in the container's data model any local changes to the container (e.g., user-entered data), but the browser would not receive any subscription updates for the container. To then transition the container back to the "inactive and subscribed" state, the bowser could re-create one or more subscriptions to receive updates for the container. Or to transition the container directly back to the "active" state, the browser could re-create one or more subscriptions for the container and rebuild/attach the container's DOM.

And the "inactive and destroyed" state could be where the browser does not maintain for the container any DOM, subscription, or data model. Thus, to transition an container from the "inactive and not subscribed" state to the "inactive and destroyed" state, the browser could delete the container's data model from the web application data model, possibly leaving certain high-level data such as an identity of the container to facilitate recreating the data model when necessary. To then transition a container from the "inactive and destroyed" state to the "inactive and not subscribed state", the browser could make one or more API calls keyed to the data model identification, so as to retrieve associated data, and the browser could then rebuild the data model of the container as part of the web application data model. Further, to transition the container directly back to the "active" state, the browser could likewise rebuild the container's data model, and the browser could re-create one or more subscriptions for the container and rebuild/attach the container's DOM.

In the example implementation, the browser could transition containers of the web application between these or other operational states based on evaluation of cumulative resource-consumption of the web application. Here, the cumulative resource-consumption of the web application could take various forms.

By way of example, the cumulative resource-consumption could be a count of how many containers in the web application are in a given one of the operational states. And when that count exceeds a threshold, the browser could dynamically transition one such container from that operational state to a less resource-intensive operational state. For this purpose, progressively higher count threshold could be set by engineering design for each progressively less resource-intensive operational state. For instance, a threshold of five containers might be set for the "active" state, and a threshold of twenty containers might be set for the "inactive but subscribed" state. Further, if a desire exists to not have containers operate in the "inactive and not subscribed" state, a threshold of twenty containers might be set for that state as well, so that containers could transition directly from the "inactive but subscribed" state to the "inactive and destroyed" stated.

And as another example, the cumulative resource-consumption could be a measure of how large web application's DOM is (e.g., in total stored bytes or other units). And when the web application's DOM becomes larger than a predefined threshold size, the browser could dynamically transition a container from the "active" state to the "inactive but subscribed" state, to help keep the web application's DOM at a reasonable size in terms of cache memory use.

Likewise, the cumulative resource-consumption could be a measure of how large web application's data model is (e.g., also in total stored bytes or other units). And when the web application's data model becomes larger than a predefined threshold size, the browser could dynamically transition a container from the "inactive but subscribed" state (or the "inactive and not subscribed state") to the "inactive and destroyed" state, to help keep the web application's data model at a reasonable size in terms of cache memory use.

And likewise, the cumulative resource-consumption could be a measure of how many subscriptions (e.g., how many open web sockets or subscription data records) the browser has in place for the web application. And when the web application's total number of subscriptions becomes more than a predefined threshold number, the browser could dynamically transition a container from the "inactive but subscribed" state to the "inactive and not subscribed state" state (or the "inactive and destroyed" state), to help keep the web application's number of subscriptions at a reasonable level.

When the browser decides through this or a similar process to transition a container from a source operational state to a target operational state, the browser may select one of the containers that is in the source operational state, with the selection being based on various factors. By way of example, for each container that is currently in the source operational state, the browser could determine how long the container has been in that operational state, and, by comparing these durations among the containers in the source operational state, the browser could identify and select the container that has been in the source operational state the longest. The browser could then transition that selected container from the source operational state to the target operational state.

Alternatively, the browser could select a container to transition from the source operational state to the target operational state based on an extent of the container's resource consumption. For instance, if DOM size is the issue, the browser could select the container having the largest DOM. Whereas, if data model size is the issue, the browser could select the container having the largest data model. And if number of subscriptions is the issue, the browser could select the container having the most number of subscriptions. Other examples are possible as well.

Figure 7:
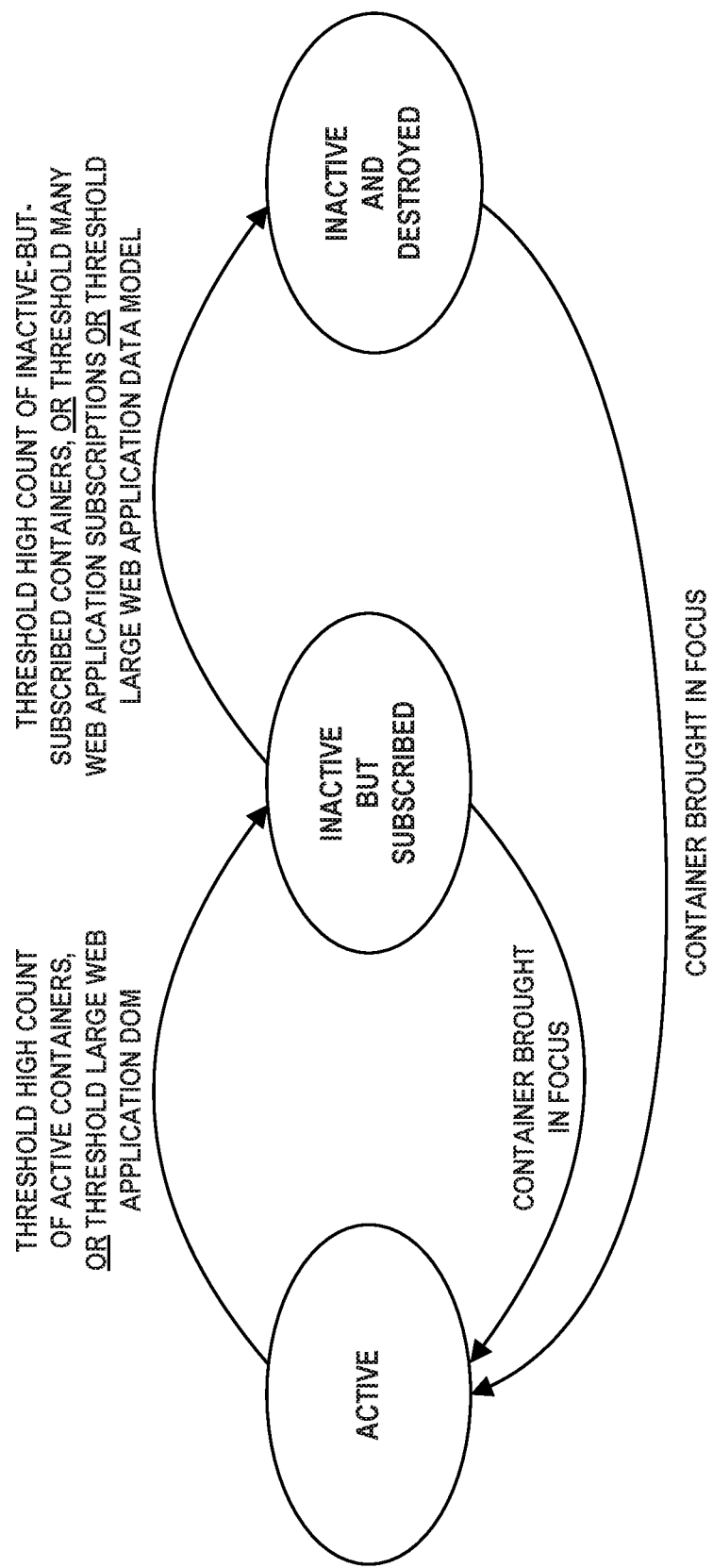
FIG. 7 is a state diagram depicting transitions of containers between operational states, in accordance with example embodiments.

FIG. 7 is a state diagram depicting how these operational state changes can occur in practice by way of example. The figure depicts three operational states: "active", "inactive but subscribed", and "inactive and destroyed". Further, the figure depicts example transitions of a representative container.

As shown, the browser transitions a container from the "active" state to the "inactive but subscribed" state when the browser detects that a threshold high count of containers in the "active" state and/or a threshold large total size of the web application's DOM. Further, the browser transitions a container from the "inactive but subscribed" to the "inactive and destroyed" state when the browser detects a threshold high count of containers in the "inactive but subscribed" state, a threshold large total size of the web application's data model, and/or a threshold high total count of subscriptions for the web application. And still further, the browser transitions a container from the "inactive but subscribed" state or the "inactive and destroyed" state to the "active" state when the container is brought into focus, such as when a user clicks on the container's header for instance.

VI. EXAMPLE OPERATIONS

Figure 8:
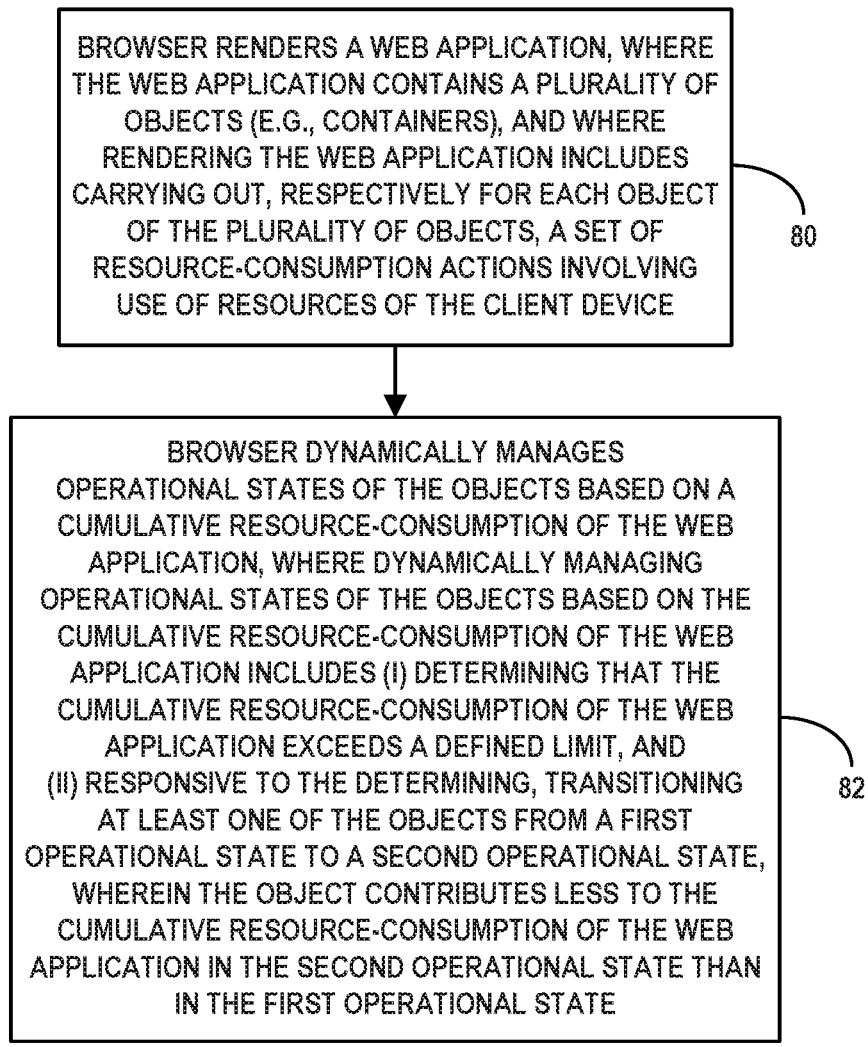
FIG. 8 is a flow chart, in accordance with example embodiments.

FIG. 8 is a flow chart illustrating an example embodiment. The process illustrated by FIG. 8 may be carried out by a computing device, such as computing device 100 for instance, including a processing unit, data storage, and a web browser application stored in the data storage and executable by the processing unit to carry various operations. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

As shown in FIG. 8, at block 80, the web browser application (browser) renders a web application, where the web application contains a plurality of objects (e.g., containers), and where rendering the web application includes carrying out, respectively for each object of the plurality of objects, a set of resource-consumption actions involving use of resources of the client device. Further, at block 82, which may occur in parallel with block 80, the browser dynamically manages operational states of the objects based on a cumulative resource-consumption of the web application, where dynamically managing operational states of the objects based on the cumulative resource-consumption of the web application includes (i) determining that the cumulative resource-consumption of the web application exceeds a defined limit, and (ii) responsive to the determining, transitioning at least one of the objects from a first operational state to a second operational state, wherein the object contributes less to the cumulative resource-consumption of the web application in the second operational state than in the first operational state.

In line with the discussion above, the set of resource-consumption actions carried out for each object comprises actions could include (i) maintaining a DOM for the object, (ii) maintaining one or more subscriptions for the object, and/or (ii) maintaining a data model for the object.

Further, as discussed above, in the first operational state of an object, the browser could maintain for the object (i) a Document Object Model (DOM), (ii) one or more subscriptions to facilitate updating of the object when changes occur to data underlying the object, and (iii) a data model defining data of the object. And in the second operational state of the object, the browser could maintain for the object the one or more subscriptions and the data model but not the DOM. Thus, the act of transitioning the object from the first operational state to the second operational state could then involve deleting the DOM of the object.

Alternatively, in first operational state of an object, the browser could maintain for the object (i) one or more subscriptions to facilitate updating of the object when changes occur to data underlying the object and (ii) a data model defining data of the object. And in the second operational state of the object, the browser might not maintain for the object any subscriptions and any data model. Thus, the act of transitioning the object from the first operational state to the second operational state could then involve releasing the one or more subscriptions and deleting the data model.

Further in line with the discussion above, the cumulative resource-consumption of the web application could include a count of how many of the objects of the web application are in the first operational state. And the act of dynamically managing operational states of the objects based on the cumulative resource-consumption of the web application could involve (i) determining that the cumulative resource-consumption of the web application exceeds a threshold count of how many of the objects of the web application are in the first operational state, and (ii) responsive to determining that the cumulative resource-consumption of the web application exceeds the threshold count of how many of the objects of the web application are in the first operational state, selecting an object that is in the first operational state and transitioning the selected object to the second operational state.

And as discussed above, the act of selecting the object that is in the first operational state could involve selecting the object based on the object having been out of focus on the rendered web application for a longest time compared with other objects in the first operational state. Alternatively, for each object in first operational state, the browser could maintain for the object a DOM, and the act of selecting the object that is in the first operational state could involve selecting the object based on the object's DOM being largest compared with other objects in the first operational state. And still alternatively, for each object in first operational state, the browser could maintain for the object one or more subscriptions to facilitate updating the object, and the act of selecting the object that is in the first operational state could involve selecting the object based on the browser maintaining most subscriptions for the object compared with other objects in the first operational state.

Further, the browser could maintain for the web application a web application DOM, the cumulative resource-consumption of the web application could be a total size of the web application DOM. In that case, for each object in the first operational state, the browser could maintain for the object a respective DOM as part of the web application DOM, and for each object in the second operational state, the browser might not maintain a DOM for the object. Then the act of dynamically managing operational states of the objects based on the cumulative resource-consumption of the web application could involve (i) determining that the total size of the web application DOM is at least a threshold size, and (ii) responsive to determining that the total size of the web application DOM is at least the threshold size, selecting an object that is in the first operational state and transitioning the selected object to the second operational state. For instance, the browser could select the object based on the object's respective DOM being largest compared with other objects in the first operational state.

Still further, the browser could maintain for the web application a web application data model, and the cumulative resource-consumption of the web application could be a total size of the web application data model. In that case, for each object in the first operational state, the browser could maintain for the object a respective data model as part of the web application data model, and for each object in the second operational state, the browser might not maintain for the object the respective data model. Then the act of dynamically managing operational states of the objects based on the cumulative resource-consumption of the web application could involve (i) determining that the total size of the web application data model is at least a threshold size, and (ii) responsive to determining that the total size of the web application data model is at least the threshold size, selecting an object that is in the first operational state and transitioning the selected object to the second operational state. For instance, the browser could select the object based on the object's respective data model being largest compared with other objects in the first operational state.

As further discussed above, the objects of the web application could be containers (e.g. tabs) within the web application, where each container encompasses one or more other objects of the web application. Alternatively, the objects could take other forms.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing device comprising:
a processing unit;
data storage; and
a web browser application stored in the data storage and executable by the processing unit to carry out operations comprising:
rendering a web application, wherein the web application contains a plurality of tabs, and wherein rendering the web application includes carrying out, respectively for each tab of the plurality of tabs, a set of resource-consumption actions involving use of resources of the client device, and
dynamically managing operational states of the tabs based on a cumulative resource-consumption of the web application, wherein dynamically managing operational states of the tabs based on the cumulative resource-consumption of the web application includes: (i) determining the cumulative resource-consumption of the web application, comprising determining a number of tabs operating in each of a plurality of operational states, (ii) determining that the cumulative resource-consumption of the web application exceeds a defined limit, (iii) responsive to the determination that the cumulative resource-consumption of the web application exceeds the defined limit, selecting a first tab of the plurality of tabs in a first operational state of the plurality of operational states to be transitioned to a second operational state of the plurality of operational states, and (iv) transitioning the first tab from the first operational state to the second operational state, wherein the first tab contributes less to the cumulative resource-consumption of the web application in the second operational state than in the first operational state.

2. The computing device of claim 1, wherein the set of resource-consumption actions carried out for each tab comprises (i) maintaining a Document Object Model (DOM) for the tab, (ii) maintaining one or more subscriptions for the tab, or (iii) maintaining a data model for the tab, or any combination thereof.

3. The computing device of claim 1,
wherein, in the first operational state of the first tab, the browser maintains for the first tab: (i) a Document Object Model (DOM), (ii) one or more subscriptions to facilitate updating of the first tab when changes occur to data underlying the first tab, and (iii) a data model defining data of the first tab,
wherein, in the second operational state of the first tab, the browser maintains for the first tab the one or more subscriptions and the data model but not the DOM, and
wherein transitioning the first tab from the first operational state to the second operational state comprises deleting the DOM of the first tab.

4. The computing device of claim 1,
wherein, in the first operational state of the first tab, the browser maintains for the first tab (i) one or more subscriptions to facilitate updating of the first tab when changes occur to data underlying the first tab and (ii) a data model defining data of the first tab,
wherein, in the second operational state of the first tab, the browser does not maintain for the first tab any subscriptions and does not maintain for the first tab the data model, and
wherein transitioning the first tab from the first operational state to the second operational state comprises releasing the one or more subscriptions and deleting the data model.

5. The computing device of claim 1, wherein selecting the first tab that is in the first operational state comprises selecting the first tab based on the first tab having been out of focus on the rendered web application for a longest time compared with other tabs of the plurality of tabs in the first operational state.

6. The computing device of claim 1,
wherein, for each tab of the plurality of tabs in first operational state, the browser maintains for the tab a Document Object Model (DOM), and wherein selecting the first tab that is in the first operational state comprises selecting the first tab based on the first tab's DOM being largest compared with other tabs of the plurality of tabs in the first operational state.

7. The computing device of claim 1,
wherein, for each tab of the plurality of tabs in first operational state, the browser maintains for the tab one or more subscriptions to facilitate updating the tab, and wherein selecting the first tab that is in the first operational state comprises selecting the first tab based on the browser maintaining most subscriptions for the first tab compared with other tabs of the plurality of tabs in the first operational state.

8. The computing device of claim 1, wherein the browser maintains for the web application a web application Document Object Model (DOM), and wherein determining the cumulative resource-consumption of the web application comprises determining a total size of the web application DOM,
wherein for each tab of the plurality of tabs in the first operational state, the browser maintains for the tab a respective DOM as part of the web application DOM, and for each tab of the plurality of tabs in the second operational state, the browser does not maintain for the tab the respective DOM, and
wherein dynamically managing operational states of the tabs based on the cumulative resource-consumption of the web application comprises (i) determining that the total size of the web application DOM is at least a threshold size, and (ii) responsive to determining that the total size of the web application DOM is at least the threshold size, selecting the first tab that is in the first operational state and transitioning the selected first tab to the second operational state.

9. The computing device of claim 8, wherein selecting the first tab that is in the first operational state comprises selecting the first tab based on the first tab's respective DOM being largest compared with other tabs of the plurality of tabs in the first operational state.

10. The computing device of claim 1, wherein the browser maintains for the web application a web application data model, and wherein the cumulative resource-consumption of the web application comprises a total size of the web application data model,
wherein for each tab of the plurality of tabs in the first operational state, the browser maintains for the tab a respective data model as part of the web application data model, and for each tab of the plurality of tabs in the second operational state, the browser does not maintain for the tab the respective data model, and
wherein dynamically managing operational states of the tabs based on the cumulative resource-consumption of the web application comprises (i) determining that the total size of the web application data model is at least a threshold size, and (ii) responsive to determining that the total size of the web application data model is at least the threshold size, selecting a tab that is in the first operational state and transitioning the selected tab to the second operational state.

11. The computing device of claim 10, wherein selecting the tab that is in the first operational state comprises selecting the tab based on the tab's respective data model being largest compared with other tabs in the first operational state.

12. The computing device of claim 1, wherein the objects plurality of tabs of the web application are containers within the web application, wherein each container encompasses one or more other tabs of the web application.

13. The computing device of claim 12, wherein the containers within the web application are objects within the web application.

14. A method comprising:
receiving, by a web browser application executing on a computing device, a web application, wherein the web application contains a plurality of tabs, and wherein rendering the web application includes carrying out, respectively for each tab of the plurality of tabs, a set of resource-consumption actions involving use of resources of the client device; and
dynamically managing, by the web browser application, operational states of the tabs based on a cumulative resource-consumption of the web application, wherein dynamically managing operational states of the tabs based on the cumulative resource-consumption of the web application includes: (i) determining the cumulative resource-consumption of the web application, comprising determining a number of tabs operating in each of a plurality of operational states, (ii) determining that the cumulative resource-consumption of the web application exceeds a defined limit, (iii) responsive to the determination that the cumulative resource-consumption of the web application exceeds the defined limit, selecting a first tab of the plurality of tabs in a first operational state of the plurality of operational states to be transitioned to a second operational state of the plurality of operational states, and (iv) transitioning the first tab from the first operational state to the second operational state, wherein the first tab contributes less to the cumulative resource-consumption of the web application in the second operational state than in the first operational state.

15. The method of claim 14, wherein the resources of the client device comprise resources selected from the group consisting of (i) memory, (ii) web sockets, and (iii) processing power.

16. The method of claim 14, wherein the set of resource-consumption actions carried out for each tab comprises (i) maintaining a DOM for the tab, (ii) maintaining one or more subscriptions for the tab to facilitate updating the tab when changes occur to data underlying the tab, or (iii) maintaining a data model for the tab, or any combination thereof.

17. The method of claim 14, wherein the browser maintains in data storage for the web application a web application model, and wherein the cumulative resource-consumption of the web application comprises a total size of the web application model,
wherein for each tab of the plurality of tabs in the first operational state, the browser maintains for the tab a respective model as part of the web application model, and for each tab of the plurality of tabs in the second operational state, the browser does not maintain for the tab the respective model, and
wherein dynamically managing operational states of the tabs based on the cumulative resource-consumption of the web application comprises (i) determining that the total size of the web application model is at least a threshold size, and (ii) responsive to determining that the total size of the web application model is at least the threshold size, selecting a tab that is in the first operational state and transitioning the selected tab to the second operational state.

18. An article of manufacture including a non-transitory computer-readable medium, having stored thereon program instructions that, upon execution by a computing system, cause the computing system to perform operations comprising:
rendering a web application, wherein the web application contains a plurality of tabs, and wherein rendering the web application includes carrying out, respectively for each tab of the plurality of tabs, a set of resource-consumption actions involving use of resources of a client device; and dynamically managing operational states of the tabs based on a cumulative resource-consumption of the web application, wherein dynamically managing operational states of the tabs based on the cumulative resource-consumption of the web application includes: (i) determining the cumulative resource-consumption of the web application comprising determining a number of tabs operating in each of a plurality of operational states (ii) determining that the cumulative resource-consumption of the web application exceeds a defined limit, (iii) responsive to the determination that the cumulative resource-consumption of the web application exceeds the defined limit, selecting a first tab of the plurality of tabs in a first operational state of the plurality of operational states to be transitioned to a second operational state of the plurality of operational states, and (iv) transitioning the first tab from the first operational state to the second operational state, wherein the first tab contributes less to the cumulative resource-consumption of the web application in the second operational state than in the first operational state.

* * * * *

UNITED STATES PATENT AND TRADEMARK OFFICE
CERTIFICATE OF CORRECTION

PATENT NO. : 10,719,572 B2
APPLICATION NO. : 16/026694
DATED : July 21, 2020
INVENTOR(S) : Chrisopher Tucker et al.

Page 1 of 1

It is certified that error appears in the above-identified patent and that said Letters Patent is hereby corrected as shown below:

In the Claims

Column 31, Claim 12, Line 61, please remove the word "objects".

Signed and Sealed this
First Day of December, 2020

Andrei Iancu
*Director of the United States Patent and Trademark Office*